United States Patent Office 3,328,387
Patented June 27, 1967

3,328,387
STEROIDGUANYLHYDRAZONES AND THEIR
PRODUCTION
Karl-Heinz Meyer and Siegismund Schütz, Wuppertal-Elberfeld, Kurt Stoepel, Wuppertal-Vohwinkel, and Hans-Günther Kroneberg, Haan, Rhineland, Germany, assignors to Farbenfabriken Bayer Aktiengesellschaft, Leverkusen, Germany, a corporation of Germany
No Drawing. Filed Sept. 1, 1964, Ser. No. 393,743
Claims priority, application Germany, Sept. 6, 1963,
F 40,690
17 Claims. (Cl. 260—211)

The present invention relates to novel guanyl hydrazones of steroids containing basic groups and procedure for their production.

German Patent No. 1,175,228 describes the production of condensation products of steroids having more than one carbonyl function and amino-guanidine or its salts. These condensation products are cardioactive.

It has now been found that condensation products with valuable pharmaceutical properties as cardiotonics are also obtained by converting steroids containing basic groups into guanyl hydrazones which may still contain free carbonyl groups. The term "basic groups" as used herein broadly means a nitrogen-containing radical or heterocycle which is capable of salt formation.

Basic groups of this type are, for example, substituted and unsubstituted amino groups, basic ethers, basic esters, basic acid amides and imides, basic sulphonic acid amides, basic ureas, urethanes and thiourethanes, and also basic hydrazones, Schiff's bases, substituted and unsubstituted guanidines, basic semicarbazones and thiosemicarbazones as well as heterocyclic rings such as, for example, pyridine or pyrrolidine which may also be linked with the steroid molecule via a hetero atom such as N, S, O and/or alkylene chains.

The term "steroids" as used herein also includes nor-, hmoo- and cyclosteroids which may be substituted by the substitutents customary in the sterine series, such as halogen, OH, acyl, alkyl, etc.

The products can be used as such or in the form of their salts with pharmaceutically aceptable non-toxic inorganic or organic acids. Suitable acids are, for example, acetic acid, propionic acid, maleic acid, fumaric acid, succinic acid, tartaric acid, citric acid, salicylic acid, naphthalene-1,5-disulphonic acid, hydrochloric acid, phosphoric acid, etc.

According to the invention the new compounds are produced by reacting:

(a) basic steroids containing as least one carbonyl function, with aminoguanidine or its salts, or
(b) thiosemicarbazones of basic steroids with ammonia, or
(c) S-alkyl-isothiosemicarbazones of basic steroids with ammonia, or
(d) hydrazones of basic steroids with cyanamide.

The thiosemicarbazones, S-alkyl-isothiosemicarbazones and hydrazones, which can be used as starting materials are obtained by reacting basic steroids which have at least one carbonyl function, with thiosemicarbazide, S-alkyl-isothiosemicarbazide, thiosemicarbazide and alkyl halide, and with hydrazine.

The invention is illustrated by the following nonlimitative examples.

EXAMPLE I

Five g. of pregn-5-ene-3-ol-20-one are dissolved in absolute tetrahydrofuran. One g. of xylene-moist sodium amide is introduced into this solution which is then boiled for 3 hours under reflux. When the evolution of ammonia is terminated, 2.8 g. of β-diethylamino-ethyl chloride are added and the mixture is subsequently boiled overnight, while stirring. The mixture is evaporated to dryness and the residue dissolved in dilute acetic acid. The acetic acid solution is rendered alkaline, decanted, and the residual viscous oil dissolved in chloroform. After drying and evaporating, there are obtained 5.8 g. of 3-(β-diethyl amino-ethyloxy)-5-pregnene-20-one. Five g. of this oil are dissolved in methanol, treated with a solution of 12 g. of aminoguanidine hydrogen carbonate in methanolic hydorchloric acid and allowed to stand acid to Congo at room temperature for 2 days. The mixture is neutralized with solid sodium bicarbonate, filtered and evaporated. The residue is dissolved in dilute acetic acid, the acetic acid solution rendered alkaline and shaken out with chloroform. After drying and evaporating, the dihydrochloride of 3 - (β-diethylamino-ethoxy)-5-pregnene-20-guanyl hydrazone of melting point 257–258° C. is precipitated from dry spirits with ethereal hydrochloric acid.

In similar manner are prepared: The dihydrochloride of 3 - (β-pyrrolidino-ethoxy)-5-pregnene - 20 - guanyl hydrazone of M.P. 260° C. and the dihydrochloride of 3-(1′,3′-bis-diethylamino-2′-propoxy)-5-pregenene -20-guanyl hydrazone of M.P. 218°.

EXAMPLE II

Three g. of oestrone are dissolved in absolute tetrahydrofuran. 0.6 g. of xylene-moist sodium amide is introduced, and the mixture is heated to boiling temperature, while stirring. When the evolution of ammonia has ceased, 1.5 ml. of β-diethylamino-ethyl chloride are added, and the mixture is boiled under reflux overnight while stirring. The mixture is finally evaporated in a vacuum, dissolved in dilute acetic acid, rendered alkaline and decanted. The oily residue is dissolved in chloroform and dried. After evaporation there remain 2 g. of a viscous oil which is dissolved in methanolic hydrochloric acid, treated with a solution of 1 g. of aminoguanidine hydrogen carbonate in methanolic hydrochloric acid and allowed to stand at room temperature for 3 days (pH 3). The reaction mixture is introduced into ether, the resultant precipitate filtered off with suction, stirred with acetone and recrystallized from ethanol. Yield: 390 mg. of the dihydrochloride of 3-(β-diethylamino-ethoxy)-oestrone-guanyl hydrazone of M.P. 185–187° C.

The following basic ethers are similarly obtained from the corresponding alcohols:

3-(β-diethylamino-ethoxy)-androst-5-ene-17-one;
17-(β-diethylamino-ethoxy)-androst-4-ene-3-one;
17-(β-diethylamino-ethoxy)-19-nor-androst-4-ene-3-one;
20-(β-diethylamino-ethoxy)-pregn-4-ene-3-one.

From these the corresponding guanyl hydrazones are analogously produced by reaction with aminoguanidine hydrogen carbonate:

The dihydrochloride of 3-(β-diethylamino-ethoxy)-androst-5-ene-17-guanyl hydrazone of M.P. 223–225° C. (decomposition);

The dihydrochloride of 17-(β-diethylamino-ethoxy)-androst-4-ene-3-guanyl hydrazone of M.P. 180–183° C. (decomposition);

The dihydrochloride of 17-(β-diethylamino-ethoxy)-19 - nor - androst - 4 - ene - 3 - guanyl hydrazone of M.P. 202–205° C. (decomposition);

The dihydrochloride of 20-(β-diethylamino-ethoxy)-pregn-4-ene-3-guanyl hydrazone of M.P. 176–180° C. (decomposition).

EXAMPLE III 9.6 g. of powdered magnesium are suspended in about 200 ml. of absolute tetrahydrofuran. Three g. of dimethyl-amino-propyl chloride are carefully added dropwise whereby a reaction sets in after a short time. A total of 50 g.

of chloride are added dropwise and the reaction mixture is maintained at boiling temperature for 1½ hours. A solution of 10 g. of testosterone acetate in absolute tetrahydrofuran is subsequently added dropwise, and the mixture is boiled under reflux for 2 hours. Finally, the mixture is decomposed with dilute hydrochloric acid while cooling with ice, and the hydrochloric acid solution shaken out several times with ether. A crystalline precipitate separates which is filtered off with suction. This residue is suspended in aqueous ammonia and shaken out with chloroform. After drying and evaporating there remain 11.37 g. of a viscous oil which crystallizes from petroleum ether. Yield: 9 g. of 3-(γ-dimethylamino-propyl)-androsta-3,5-diene-17-ol of M.P. 85° C.

$$(E_{1\ cm.}^{1\%})_{239\ m\mu} = 726$$

2.5 g. of this basic steroid alcohol are boiled in 250 ml. of absolute toluene and 10 ml. of cyclohexane on a water separator until about 10 ml. have distilled over. Four g. of aluminium isopropylate in 25 ml. of absolute toluene are then added and the mixture is boiled under reflux for two hours. The solvent is subsequently distilled off and the residue dissolved in dilute acetic acid. The acetic acid solution is extracted with ether, rendered alkaline and the resultant precipitate is separated. The residue is boiled out with ethanol, the alcohol evaporated and the remaining residue boiled out with ethyl acetate. From ethyl acetate a product is obtained which melts at 130° C.

$$(E_{1\ cm.}^{1\%})_{240\ m\mu} = 820$$

Ninety mg. of this ketone are dissolved in a little methanol and allowed to stand with a solution of 45 mg. of amino-guanidine hydrogen carbonate in methanolic hydrochloric acid at room temperature (pH 3) for 3 days. The mixture is then precipitated by introducing it into about 100 ml. of ether, decanted, and the residue is treated with acetone. The product is finally reprecipitated from methanol/ether. Ninety mg. of the dihydrochloride of 3-(γ-dimethylamino - propyl) - androsta - 3,5 - diene - 17-guanyl hydrazone are obtained of M.P. 230–235° C.

In analogous manner, pregn-5-ene-3-ol-20-one is converted into 20-(γ-dimethylamino-propyl)-pregn-5-ene-3,20-diol which is oxidized according to Oppenauer to give the ketone and reacted with aminoguanidine hydrochloride. The dihydrochloride of 20-(γ-dimethylamino-propyl)-pregn-4-ene-20-old-3-guanyl hydrazone is thus obtained of M.P. 218–220° C.

$$(E_{1\ cm.}^{1\%})_{270\ m\mu} = 507$$

It crystallizes with 1 mole of alcohol.

EXAMPLE IV 2.2 g. of 3-(1-pyrrolidino)-pregna-3,5-diene-20-one are dissolved in 200 ml. of absolute ethanol with warming and treated with a solution of 0.9 g. of aminoguanidine hydrogen carbonate in methanolic hydrochloric acid having a pH value of 2. The mixture is allowed to stand at room temperature under nitrogen for 12 hours, stirred into 1 litre of ether, the precipitate flakes are filtered off with suction and recrystallized from methanol with the addition of acetone.

Two g. of the dihydrochloride of 3-(1-pyrrolidino)-pregna-3,5-diene-20-guanyl hydrazone of M.P. 263–265° C. (decomposition) are obtained.

EXAMPLE V 0.65 g. of aminoguanidine hydrogen carbonate are dissolved in methanolic hydrochloric acid until the pH value is 2, a solution of 1.7 g. of 17-[N-methyl-N-3'-dimethylamino)-propyl]-androst-4-ene-3-one, prepared by Oppenauer's oxidation of 17-[N-methyl-N-(3'-dimethylamino)-propyl]-androst-5-ene-3β-ol in methanolic hydrochloric acid, and the mixture is allowed to stand under nitrogen at room temperature for 3 days. The reaction solution is then poured into ether and decanted, the viscous residue is triturated with acetone and the crystals formed are filtered off with suction. They are boiled with acetone and recrystallized from ethanol with the addition of methanol.

0.5 g. of the trihydrochloride of 17-[N-methyl-N-(3'-dimethylamino)-propyl]-androst-4-ene-3-guanyl hydrazone of M.P. 271–273° C. (decomposition) are obtained.

The dihydrochloride of 2-(pyrrolidino-methylene)-5α-androstane-17β-ol-3-guanyl hydrazone of M.P. 190–192° C. (decomposition) is prepared in analogous manner.

EXAMPLE VI 520 g. of aminoguanidine hydrogen carbonate are dissolved in methanolic hydrochloric acid until the pH value is 2, and treated with a solution of 1.7 g. of 21-(N-morpholinomethylene)-pregn-5-ene-3β-acetoxy-20-one hydrochloride in 30 ml. of methanol. The mixture is allowed to stand under nitrogen at room temperature for 3 days and stirred into ether, the precipitate formed is filtered off with suction, boiled with acetone and recrystallized from alcohol.

0.5 g. of the dihydrochloride of 21-(morpholinemethylene)-pregn - 5 - ene - 3β-ol-20-guanyl hydrazone of M.P. 197–199° C. (decomposition) are obtained.

EXAMPLE VII 0.45 g. of aminoguanidine hydrochloride are dissolved in methanolic hydrochloric acid until the pH value is 2 and treated with a solution of 1 g. of 3β-amino-5β-pregnane-20-one hydrochloride in 25 ml. of methanol. The mixture is then allowed to stand at room temperature under nitrogen for 3 days. The reaction solution is then stirred into ether and the precipitate formed is filtered off with suction, boiled with acetone and recrystallized from alcohol/acetone. 0.6 g. of the dihydrochloride of 3β-amino-5β-pregnane-20-guanyl hydrazone of M.P. 228–230° C. (decomposition) are obtained.

EXAMPLE VIII

A solution of 0.9 g. of 3-keto-Δ⁴-androstene-2'-methyl-(16,17-d)-pyrimidine in 25 ml. of methanol is added to a solution of 440 mg. of aminoguanidine hydrogen carbonate in methanolic hydrochloric acid with a pH value of 2. The solution is allowed to stand at room temperature under nitrogen for three days and stirred into 1 litre of ether, the precipitate formed is filtered off with suction and boiled several times with acetone. 0.8 g. of the dihydrochloride of Δ⁴-androstene - 2' - methyl-(16,17-d)-pyrimidino-3-guanyl hydrazone of M.P. 238–240° C. (decomposition) are obtained.

In analogous manner are prepared: The dihydrochloride of Δ⁴-androstene-(17,16-c)-pyrazolo-3-guanyl hydrazone of M.P. 250° C. (decomposition) and the dihydrochloride of Δ⁴-androstene-(3,2-c)-pyrazolo-17-guanyl hydrazone of M.P. 322–324° C. (decomposition).

EXAMPLE IX

Two hundred mg. of aminoguanidine hydrogen carbonate are dissolved in methanolic hydrochloric acid until the pH value is 2, and treated with a solution of 500 mg. of solanid-4-ene-3-one in methanol. The solution is allower to stand at room temperature under nitrogen for three days and then stirred into 500 ml. of ether, the precipitate formed is filtered off with suction and recrystallized from alcohol. 0.4 g. of the dihydrochloride of solanid-4-ene-3-guanyl hydrazone of M.P. 320–322° C. (decomposition) are obtained.

The dihydrochloride of solasod-4-ene-3-guanyl hydrazone of M.P. 246–248° C. (decomposition) is prepared in analogous manner.

EXAMPLE X 740 mg. of aminoguanidine hydrogen carbonate are dissolved in methanolic hydrochloric acid until the pH value is 2; a solution of 1 g. of cortisone-21-(N-pyridyl) chloride in 30 ml. of methanol is added thereto and the mixture is stirred at room temperature under nitrogen for three days. The precipitated crystals are filtered off with suction and washed with a little methanol. 0.4 g. of the hydrochloride of the 3-guanyl hydrazone of cortisone-2-(N-pyridyl) chloride of M.P. 360° C. are obtained.

EXAMPLE XI

A solution (pH 2) of 600 mg. of aminoguanidine hydrogen carbonate in methanolic hydrochloric acid is treated with a solution of 1.2 g. of 20β-amino-pregn-4-ene-3-one in 50 ml. of methanol and the mixture is allowed to stand at room temperature under nitrogen for three days. It is then stirred into 500 ml. of ether, the precipitate formed is filtered off with suction, boiled several times with acetone and reprecipitated from alcohol/acetone.

0.9 g. of the dihydrochloride of 20β-amino-pregn-4-ene-3-guanyl hydrazone of M.P. 275–277° C. (decomposition) are obtained.

In analogous manner there are prepared: The dihydrochloride of 3β-amino-5β-androstane-17-guanyl hydrazone of M.P. 294–296° C. (decomposition) and the dihydrochloride of 16β-(N-morpholino)-pregn-4-ene-(17β-ol-20-one-3-guanyl hydrazone of M.P. 245–247° C. (decomposition).

EXAMPLE XII

A solution of 900 mg. of 17β-(2'-amino-4'-thiazolyl)-androst-4-ene-3-one in methanolic hydrochloric acid is added to a solution (pH 2) of 370 mg. of aminoguanidine hydrogen carbonate in methanolic hydrochloric acid. The mixture is stirred under nitrogen at room temperature for three days, the precipitated crystals are filtered off with suction, boiled twice with acetone and then with alcohol.

One g. of the dihydrochloride of 17β-(2' - amino-4'-thiazolyl)-androst-4-ene-3-guanyl hydrazone of M.P 260° C. (decomposition) is obtained.

In analogous manner there are prepared: The dihydrochloride of 17α - hydroxy - 17β - (2'-amino-4'-thiazolyl)-androst-4-ene-3-guanyl hydrazone of M.P. 252–254° C. (decomposition), the dihydrochloride of 17β-[2'-amino-5'-(6'H-1',3',4'-thiadizinyl)]-androst-4-ene-3-guanyl hydrazone of M.P. 256° C. (decomposition) and the dihydrochloride of 17α - hydroxy-17β - [2-amino-5'-(6'H-1',3',4'-thiadiazinyl)]-androst-4-ene-3-guanyl hydrazone of M.P. 276–278° C. (decomposition).

EXAMPLE XIII 0.2 g. 2-hydrazino-4,6-dimethyl - pyrimidine are dissolved in methanolic hydrochloric acid until the pH value is 2, a solution of 0.5 g. of pregn-4-ene-3-one-20-guanyl hydrazone in 50 ml. of ethanol is added thereto, and the mixture is stirred under nitrogen at room temperature for 3 days. It is then stirred into ether, the precipitate is filtered off with suction and boiled several times with acteone.

0.4 g. of the dihydrochloride of pregn-4-ene-3-[(4',6'-dimethyl-pyrimidine-2')-hydrazone] - 20 - guanyl hydrazone of M.P. 284° C. (decomposition) are obtained.

EXAMPLE XIV

Two hundred mg. of 2-amino-4-hydrazino-6-methyl-pyrimidine are dissolved in methanolic hydrochloric acid until the pH value is 2, and a solution of 0.5 g. of pregn-4-ene-3-one-20-guanyl hydrazone are added thereto. The mixture is stirred under nitrogen at room temperature for 3 days, the precipitated crystals are filtered off with suction and washed with ether.

0.3 g. of the dihydrochloride of pregn-4-ene-3-[(2'-amino-6'-methyl-pyrimidine-4')-hydrazone] - 20 - guanyl hydrazone of M.P. 338–340° C. (decomposition) are obtained.

The dihydrochloride of pregn-4-ene-3-[(3'-methyl-1',2',4'-thiadiazole-5')-hydrazone] - 20 - guanyl hydrazone of M.P. 307° C. (decomposition) is prepared in analogus manner.

EXAMPLE XV 0.5 g. of pregn-4-ene-3-one-20-guanyl hydrazone are dissolved in 25 ml. of ethanol. 0.3 ml. of O-(β-diethylaminoethyl)-hydroxylamine is added thereto and methanolic hydrochloric acid is dropped in until the solution has a pH value of 5–6. The mixture is allowed to stand at room temperature under nitrogen for 3 days and filtered, the filtrate is stirred into ether, the precipitate filtered off with suction and boiled several times with acetone.

0.6 g. of the dihydrochloride of pregn-4-ene-3-[(β-diethylamino-ethyl)-oxime]-20-guanyl hydrazone of M.P. 215° C. (decomposition) are obtained.

EXAMPLE XVI 280 mg. of N-amino-N'-(β-diethylamino - ethyl)-thiourea are dissolved in methanolic hydrochloric acid, treated with a solution of 0.5 g. of pregn-4-ene-3-one-20-guanyl hydrazone and stirred at room temperature under nitrogen for 3 days. The precipitated crystals are filtered off with suction and boiled several times with acetone.

0.7 g. of the dihydrochloride of pregn-4-ene-3-[(β-diethylamino - ethyl) - thiosemicarbazone] - 20 - guanyl hydrazone of M.P. 253° C. (decomposition) are obtained.

The dihydrochloride of pregn-4-ene-3-(S-methyl-isothiosemicarbazone)-20-guanyl hydrazone of M.P. 290° C. (decomposition) is prepared in analogus manner.

EXAMPLE XVII 0.2 g. of 1,3-diamino-guanidine dihydrochloride are dissolved in methanolic hydrochloric acid until the pH vaule is 2, and a solution of 0.8 g. of pregn-4-ene-3-one-20-guanyl hydrazone in 50 ml. of ethanol is added thereto. The mixture is stirred under nitrogen at room temperature for 3 days, the precipitated crystals are filtered off with suction and boiled with acetone.

0.6 g. of the trihydrochloride of N,N'-bis-[(pregn-4-ene-20-guanyl-hydrazone)-3-imino-]-guanidine of M.P. 298–300° C. (decomposition) are obtained.

EXAMPLE XVIII 550 mg. of D-Glucamine are dissolved in 40 ml. of methanol, mixed with a solution of 1 g. of pregn-4-ene-3-one-20-guanyl hydrazone in 20 ml. of benzol, 20 ml. of chloroform and 20 ml. of ethanol and heated under reflux for 1 hour, then dehydrated to dryness under vacuum and recrystallized from alcohol/ether. 1.5 g. of 3-(1'-desoxy-D-sorbityl-1')-imino-pregn-4-ene-20-guanyl hydrazone of M.P. 176° C. are obtained.

500 mg. of the 3-(1'-desoxy-D-sorbityl-1')-imino-pregn-4-ene-20-guanyl hydrazone were dissoleved in absolute methanol and under addition 1 of Raney/Ni as catalyst hydrated at room temperature under normal pressure. After 1 hour, the catalyst is filtered off, the filtrate is mixed with ethereal hydrochloric acid until it has an acid reaction and is stirred into ether. The precipitated flakes are suction filtered and boiled with acetone. 0.4 g. of the dihydrochloride of 3-[N-1'-(1'-desoxy-glucosyl)]-pregnan-20-guanyl hydrazone of M.P. 114° C. (decomposition) are obtained.

EXAMPLE XIX 0.5 g. of androst-4-ene-3-one-17β-yl-chloroformic acid ester and 340 mg. of aminoguanidine hydrochloride were mixed and heated to 150° C. for 2 hours. The cooled melt is then recrystallized from ethanol. 0.3 g. of the dihydrochloride of 17β-(androst-4-ene-3-guanyl hydrazone)-N-guanidino-carbamate of M.P. 214° C. (decomposition) are obtained.

EXAMPLE XX 3.3 g. of 3β-pyrrolidino-androsta-3,5-diene-17-one are dissolved in 200 ml. of absolute ethanol and a few drops of methanolic hydrochloric acid, a solution of 1.5 g. of aminoguanidine hydrogen carbonate in methanolic hydrochloric acid (pH 2) is added thereto and allowed to stand 12 hours under nitrogen at room temperature. The reaction solution is stirred into ether, the precipitate which forms is suction filtered and boiled out with acetone. 3.5 g. of the dihydrochloride of 3β-pyrrolidino-androsta-3,5-diene-17 guanyl hydrazone of M.P. 256° C. (decomposition) are obtained.

EXAMPLE XXI

There is added thereto dropwise a saturated solution of 250 mg. of Girard T reagent in ethanol, the reaction solution is adjusted by means of methanolic hydrochloric acid to a pH value of 5–6 and stirred 48 hours at room temperature. The resulting milky liquid is stirred in dried ether and the flocculent, colorless precipitate filtered with suction, dried and boiled out with acetone. The obtained pregn - 4 - ene - 3 - (trimethyl-ammonium-acet-hydrazone chloride) - 20 - guanyl hydrazone hydrochloride melts at 290–292° C. (decomposition).

The new guanyl hydrazones of steroids containing basic groups in accordance with the present invention may be used or administered by any suitable route in any suitable dosage form either as such or in the form of a pharmaceutically acceptable salt. Their cardiotonic action acts favorably on heart muscle to strengthen the same and generally has beneficial cardiac effects.

What is claimed is:

1. A compound selected from the group consisting of a condensation product and its pharmaceutically acceptable non-toxic salts, said condensation product resulting from the reaction of a steroid having one carbonyl group in position 3, 17 or 20 or two carbonyl groups in the 3,20-positions or three carbonyl groups in the 3,11,20-positions and containing a basic group in the 2-, 3-, 16-, 17-, 20- or 21-position with aminoguanidine and wherein said basic group is a 2-pyrrolidino-ethoxy-, 1,3-bis-diethylamino - 2 - propoxy-, 2-diethylaminoethoxy-, 3-dimethylaminopropyl-, pyrrolidino-, N-methyl - N - (3 - dimethylamino - propyl)-, pyrrolidino - methylene-, morpholinomethylene-, amino-, pyridino-, morpholino-, 2-amino-4-thiazolyl-, 2-amino-5-(6H-1,3,4-thiadiazinyl)-, (4,6-dimethyl-pyrimidine-2)-hydrazone-, (2-amino-6-methyl-pyrimidine - 4) - hydrazone-, (3-methyl-1,2,4-thiadiazole-5)-hydrazone-, (2-diethylamino - ethyl)-oxime-, (2-diethylaminoethyl)-thiosemicarbazone-, s-methyl-isothiosemicarbazone-, (1-desoxy-D-sorbityl-1)-imino-, (1-desoxyglucosyl-1)-amino-, N-guanidino-carbamate-, or (trimethyl-ammonium-acetyl)-hydrazone- or a pyrazole or pyrimidine ring linked with the steroid molecule in positions 2, 3, or 16, 17.

2. A compound according to claim 1, in which the obtained guanyl hydrazones still contain free carbonyl groups in the 11- and 20-positions.

3. The dihydrochloride of 3-(β-diethylamino-ethoxy)-5-pregnene-20-guanyl hydrazone.

4. The dihydrochloride of 3-(β-pyrrolidino-ethoxy)-5-pregnene-20-guanyl hydrazone.

5. The dihydrochloride of 3-(1′,3′-bis-diethylamino-2′-propoxy)-5-pregnene-20-guanyl hydrazone.

6. The dihydrochloride of 3-(β-diethylamino-ethoxy)-oestrone-guanyl hydrazone.

7. The dihydrochloride of 17-(β-diethylamino-ethoxy)-19-nor-androst-4-ene-3-guanyl hydrazone.

8. The dihydrochloride of 20-(γ-dimethylamino-propyl)-pregn-4-ene-20-ol-3-guanyl hydrazone.

9. The trihydrochloride of 17-[N-methyl-N-(3′-dimethylamino)-propyl]-androst-4-ene-3-guanyl hydrazone.

10. The dihydrochloride of 21-(morpholine-methylene)-pregn-5-ene-3β-ol-20-guanyl hydrazone.

11. The dihydrochloride of $\Delta^4$-androstene-2′-methyl-(16,17-d)-pyrimidino-3-guanyl hydrazone.

12. The dihydrochloride of solasod-4-ene-3-guanyl hydrazone.

13. The dihydrochloride of the 3-guanyl hydrazone of cortisone-21-(N-pyridyl) chloride.

14. The dihydrochloride of pregn-4-ene-3-[(2′-amino-6′ - methyl - pyrimidine-4′)-hydrazone]-20-guanyl hydrazone.

15. The dihydrochloride of pregn-4-ene-3-[(β-diethylamino-ethyl)-thiosemicarbazone]-20-guanyl hydrazone.

16. The trihydrochloride of N,N′-bis-[(pregn-4-ene-20-guanyl hydrazone)-3-imino]-guanidine.

17. 3-(1′ - desoxy-D-sorbityl-1′)-imino-pregn-4-ene-20-guanyl hydrazone.

References Cited

Barnett et al., "Biochem. Jour.," vol. 40, pages 450 to 453 (1946).

Pesez et al., "Bull. Soc. Chim. France," pages 488 to 490 (1958).

LEWIS GOTTS, *Primary Examiner.*

HENRY A. FRENCH, *Assistant Examiner.*